W. F. FRYCKBERG.
POST HOLE DIGGER AND SHOVEL.
APPLICATION FILED NOV. 20, 1911.
1,028,872.
Patented June 11, 1912.
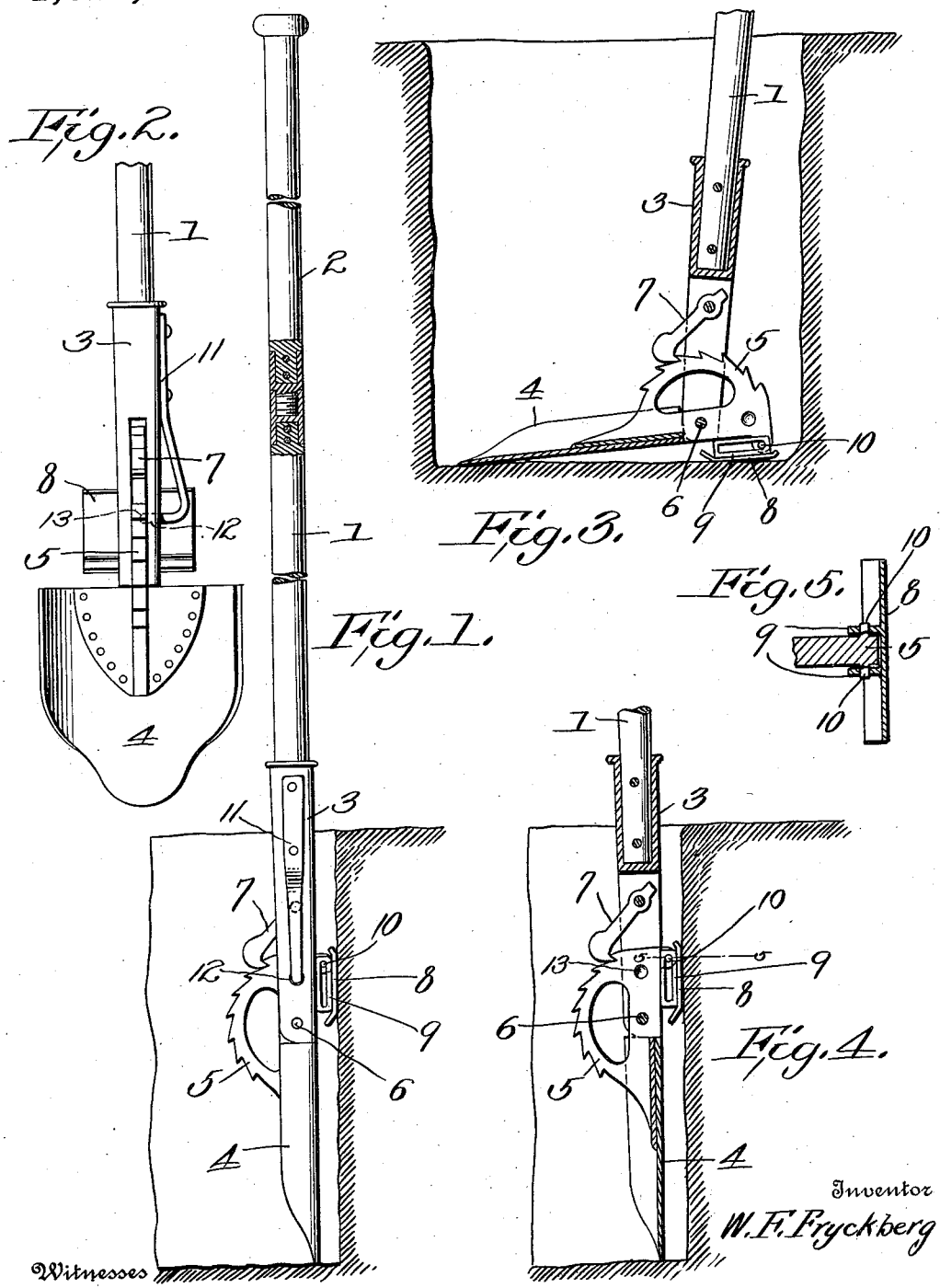
Witnesses
Olvn H. Holmes
E. B. McBath
Inventor
W. F. Fryckberg
By Chas E Brock
Attorney

UNITED STATES PATENT OFFICE.

WILLIAM F. FRYCKBERG, OF PHILADELPHIA, PENNSYLVANIA.

POST-HOLE DIGGER AND SHOVEL.

1,028,872. Specification of Letters Patent. Patented June 11, 1912.

Application filed November 20, 1911. Serial No. 661,341.

*To all whom it may concern:*

Be it known that I, WILLIAM F. FRYCK-BERG, a citizen of the United States, residing at Philadelphia, in the county of Philadelphia and State of Pennsylvania, have invented a new and useful Improvement in Post-Hole Diggers and Shovels, of which the following is a specification.

This invention relates to a combined post hole digger and shovel, the object of the invention being to hold the shovel rigid in alinement with the handle during the initial digging operation, and during subsequent steps of the operation to throw the shovel at an angle to the handle, gradually bringing said shovel, as the hole is dug, into a position approximately at a right-angle to the handle, or as near such an angle as is practicable in digging the post hole.

The invention consists of the novel features of construction hereinafter described, pointed out in the claims and shown in the accompanying drawings, in which, Figure 1 is a side elevation of the complete device in position for use, portion of the handle being broken away and partly shown in section. Fig. 2 is a face view of the shovel and the handle socket, the handle being broken away. Fig. 3 is a sectional view illustrating the position of the parts when the shovel is in position approaching the horizontal. Fig. 4 is a side elevation, partly in section showing the shovel locked in vertical alinement with the handle. Fig. 5 is an enlarged detail section upon the line 5—5 of Fig. 4.

In these drawings, 1 represents the handle provided with an upper detachable section 2 and carrying at its lower end a socket 3, in the upper portion of which the handle 1 is secured, and to the lower portion of said socket I pivotally secure a shovel 4. Rigidly fixed upon the shovel is a ratchet 5, the ratchet frame serving as a means for connecting the shovel to the socket 3, the socket being suitably bifurcated and the ratchet and its frame working in said bifurcation. A pivot pin 6 passes transversely through the lower end portion of the socket and through the frame of the ratchet 5, as most clearly shown in Figs. 3 and 4. A pawl 7 is pivotally mounted in the upper portion of the bifurcation of the socket 3 and is adapted to engage the ratchet 5. A plate 8 having its lower margin bent inwardly is provided with parallel slotted lugs 9 and the upper rear end of the ratchet 5 projects between said lugs and is secured thereto by pins or trunnions 10, which work in the slots of the lugs 9. The plate 8 is adapted to bear against the wall of earth immediately above the shovel and furnishes a support or bearing for the shovel during the turning operation.

A flat curved spring 11 has its upper portion bolted to the side of the socket 3 and a member of the bifurcated portion of the socket is provided with an opening 12, through which the curved portion of the spring extends. This curved lower end terminates in a point which seats itself in an opening 13 formed in the ratchet 5 and locks the parts in the position shown in Fig. 1. With the parts so locked the post hole is started and when it is deep enough to bring the plate 8 into position to bear against the earthen wall on one side, the handle is thrown sharply forward, disengaging the spring from the opening 13, thus unlocking the shovel. The digging operation is continued and the handle is gradually pulled rearwardly, that is toward the earthen wall against which the plate 8 bears, said plate furnishing a fulcrum or backing, which could not otherwise be secured if the parts were compelled to work against soft or loose earth. As the handle is worked back and forth the pawl 7 will grip the ratchet teeth and the ratchet 5 will be worked through the bifurcation of the socket 3, thus throwing the shovel step by step from the vertical to an approximately horizontal position, forcing it deeper into the earth and also enlarging the bottom area of the post hole. As soon as the shovel has reached the position shown in Fig. 3, it can be elevated, thus bringing up with it the earth which has been loosened. The free end or point of the spring 11 is rounded so that when disengaged from the opening 13, it will ride easily over the side of the ratchet. After the dirt has been dumped by knocking the point of the blade against the ground, face down, the point of the spring will ride back and snap into the opening 13. The above described operation can then be repeated until the post hole is of the desired depth.

What I claim is:

1. A device of the kind described comprising a handle having a bifurcated socket at its lower end, a shovel pivotally carried by said socket, a ratchet carried by the shovel and working through said bifurcation, a bearing plate carried by said ratchet, said bearing plate being upon the rear side of the socket, and a pawl pivoted to said socket and adapted to engage the ratchet.

2. In a device of the kind described, a handle, a bifurcated socket in which the handle is secured, a shovel, a segmental ratchet carried by said shovel, the ratchet being pivoted in and extending through said bifurcation, a bearing plate loosely carried by the upper end of the ratchet, a pawl carried by the socket and adapted to engage the ratchet and means for temporarily locking the shovel, in vertical alinement with the handle.

3. A post hole digger comprising a handle, a slotted socket carried by the lower end of the handle, a shovel pivotally connected to said socket, a ratchet carried by the shovel, said ratchet working through the bifurcation of the socket, said ratchet and the slotted portion of the socket having openings adapted to aline when the parts are in normal position, and a spring secured to the socket, the free end portion of the spring being adapted to enter said openings, as and for the purpose set forth.

WILLIAM F. FRYCKBERG.

Witnesses:
L. B. A. KELLY,
CORNELIUS A. GALLAGHER.

---

Copies of this patent may be obtained for five cents each, by addressing the "Commissioner of Patents, Washington, D. C."